July 11, 1967     D. C. PORTER     3,330,290
WATER-FERTILIZER MIXING PUMP
Filed Oct. 17, 1963     4 Sheets-Sheet 4
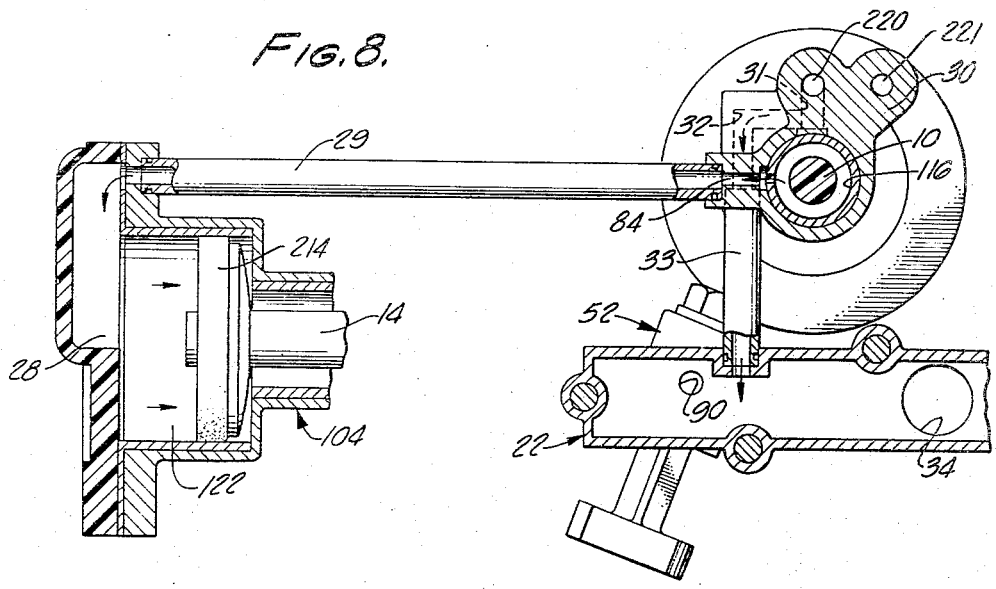
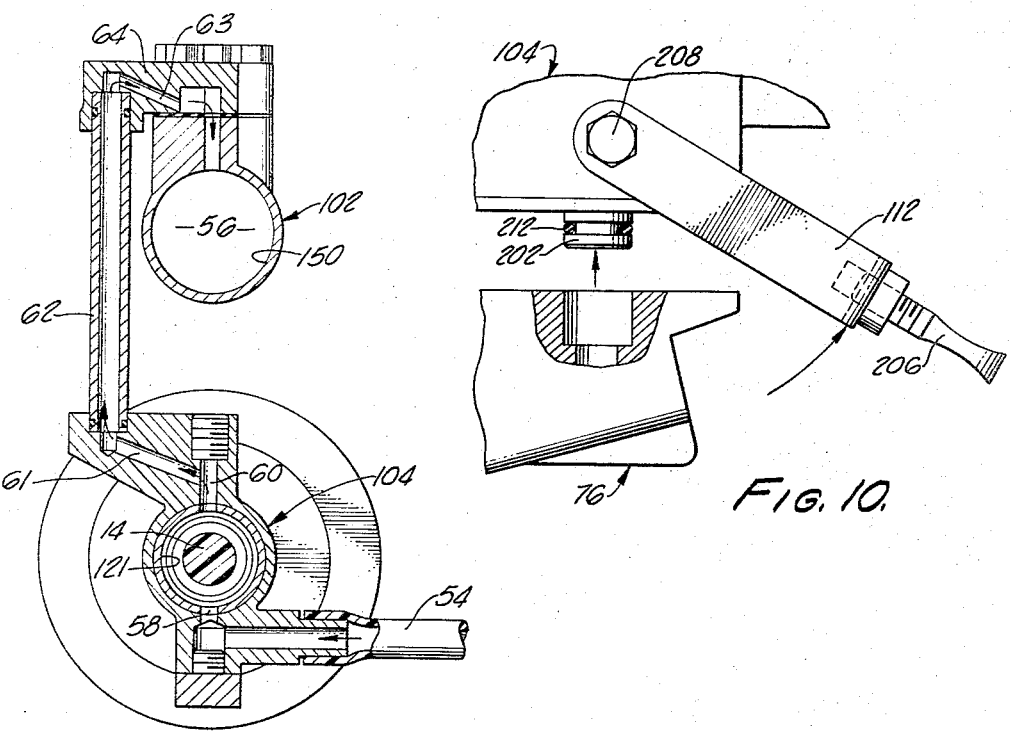
INVENTOR.
DONALD C. PORTER
BY
*Vrl R. Goshaw*
ATTORNEY

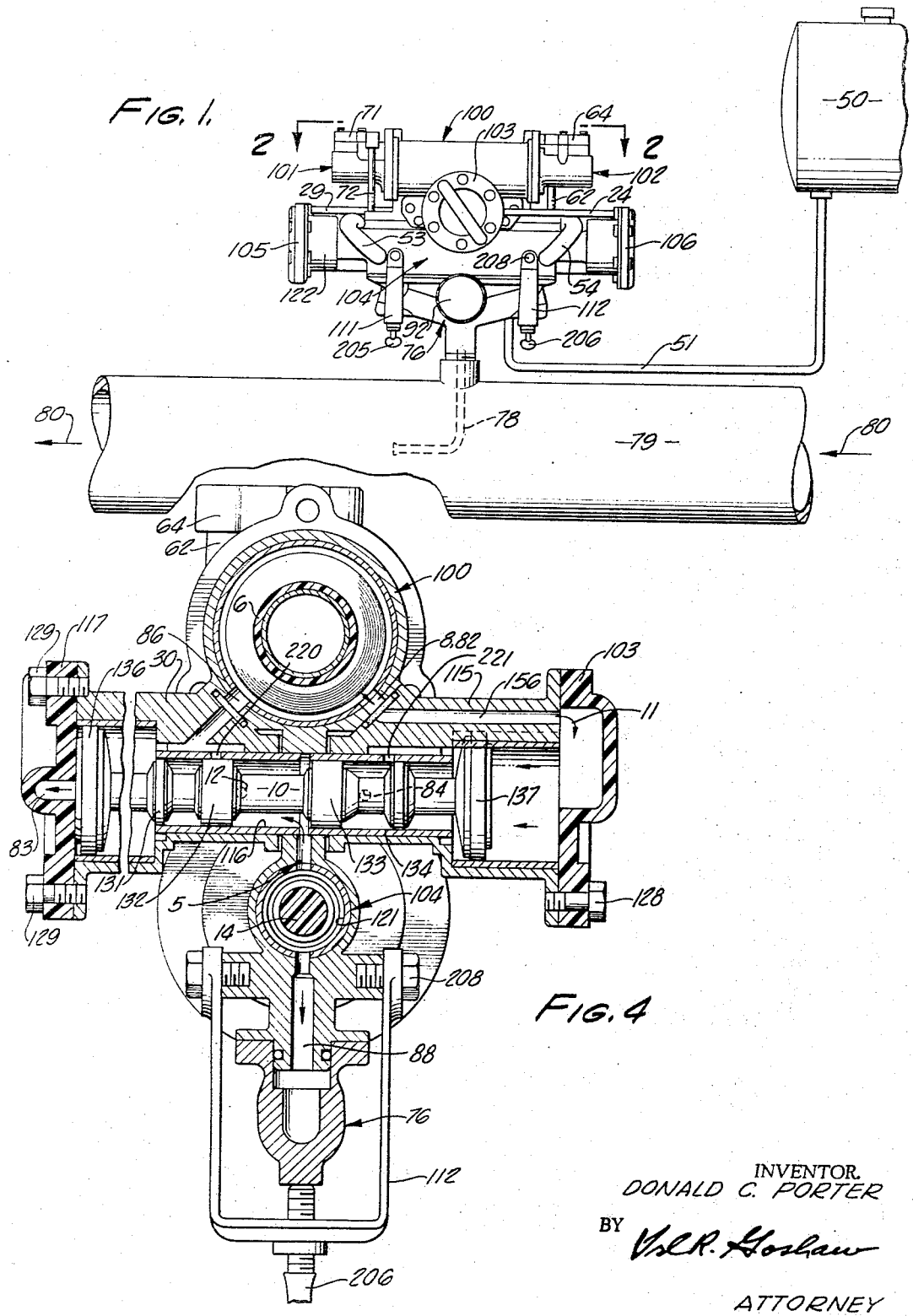

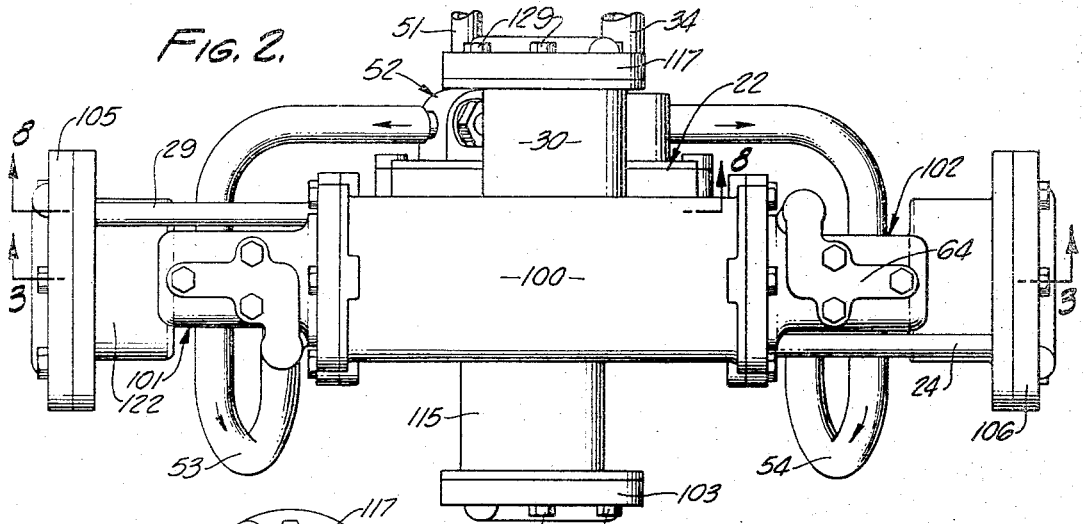
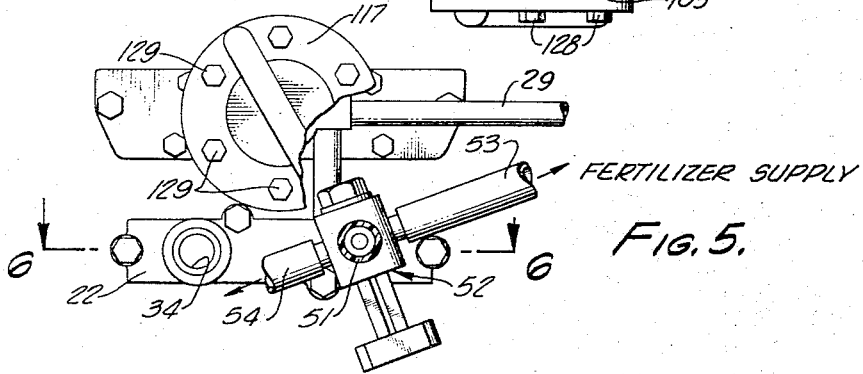
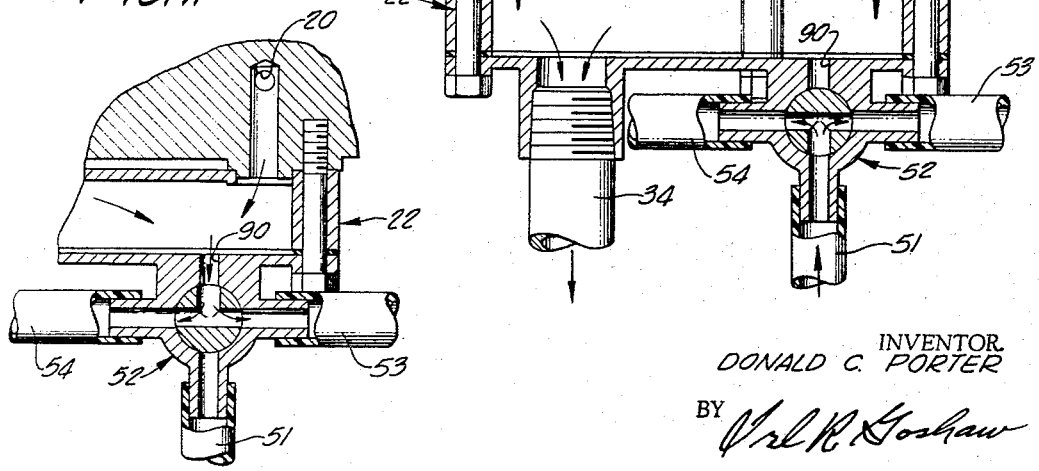

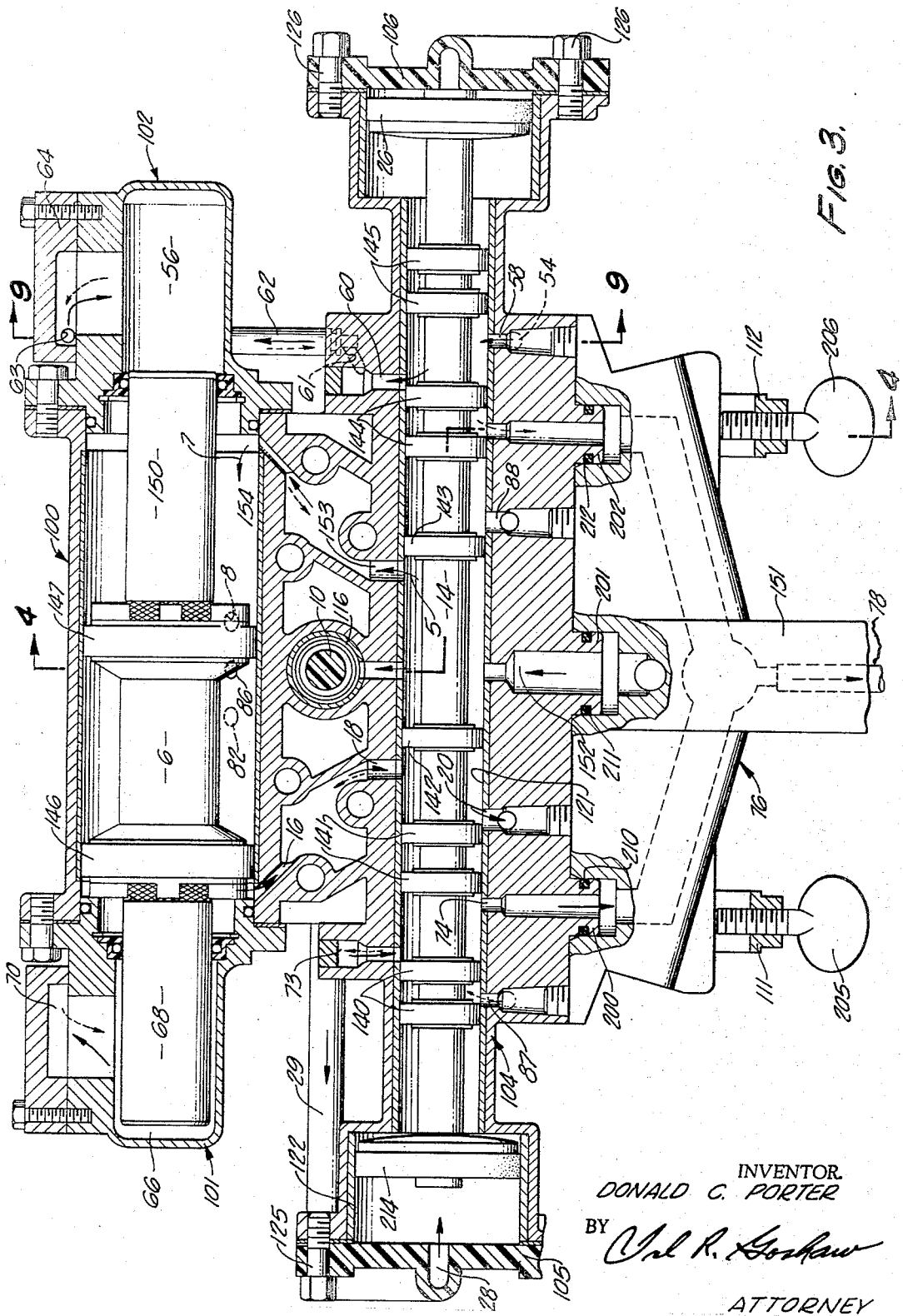

United States Patent Office 3,330,290
Patented July 11, 1967

3,330,290
WATER-FERTILIZER MIXING PUMP
Donald C. Porter, Yucaipa, Calif., assignor to
Jay Q. Davis, Huntington Park, Calif.
Filed Oct. 17, 1963, Ser. No. 316,881
7 Claims. (Cl. 137—99)

This invention relates to hydraulic-operated pumps for injecting one liquid into another, such as liquid fertilizer into irrigation water, and is an improvement over the basic type of pump disclosed and claimed in my U.S. Patent No. 2,290,640, of Jan. 12, 1960.

The operating principle of the patented pump is utilized in the present pump, but the present pump has a higher efficiency which permits operation at lower water pressures. It is constructed with outer conduits to simplify and economize the manufacture thereof and is provided with a manifold to and from which the pump may be readily connected and disconnected. A flushing feature has been incorporated in the pump which permits it to flush and wash out any fertilizer in the fertilizer portion of the pump.

The present pump has larger water pressure surfaces for the pilot and control valves, new floating seals for the power cylinder and pistons and new longitudinally sliding valves for the control cylinder.

The principal object of the invention, therefore, is to facilitate the injection of one liquid into another liquid in a controlled manner.

Another object of the invention is to provide an improved hydraulic-operated pump for injecting one fluid into another fluid.

A further object of the invention is to provide an improved hydraulic-operated pump which controls the amount of liquid fertilizer injected into irrigation water.

A still further object of the invention is to provide a highly efficient hydraulic-operated pump adapted to inject liquid fertilizer into irrigation water at low water pressures.

A still further objeit of the invention is a hydraulic-operated pump for injecting liquid fertilizer into irrigation water and using the water to flush and clean the fertilizer portion of the pump.

A better understanding of this invention may be had from the following detailed description when read in connection with the accompanying drawings, in which:

FIG. 1 is a general elevational view of the pump connected to water and fertilizer supplies;

FIG. 2 is a top plan view taken along the line 2—2 of FIG. 1;

FIG. 3 is a longitudinal sectional view taken along the line 3—3 of FIG. 2;

FIG. 4 is a transverse sectional view taken along the line 4—4 of FIG. 3;

FIG. 5 is a fragmentary rear elevational view;

FIG. 6 is a horizontal sectional view taken along the line 6—6 of FIG. 5 showing the fertilizer valve in one position;

FIG. 7 is a horizontal sectional view similar to FIG. 6 and showing the fertilizer valve in an alternate positon;

FIG. 8 is a fragmentary sectional view taken substantially on the line 8—8 of FIG. 2;

FIG. 9 is a vertical sectional view taken along the line 9—9 of FIG. 3; and

FIG. 10 is a fragmentary elevational view illustrating how the pump unit is removed from the supply manifold of the pump.

Referring, now, to the drawings in which the same reference numerals identify the same elements, and particularly to FIGS. 1-3 a power cylinder 100 has fertilizer cylinders 101 and 102, a pilot valve cylinder 116 with end bells 103 and 117 and a control cylinder 104 with end bells 105 and 106. The pump is attached to a manifold 76 by clevis members 111 and 112, which manifold is mounted on an irrigation water pipe 79. Liquid fertilizer is fed to the pump through a feed pipe 51 from a liquid fertilizer supply tank 50.

As shown in FIG. 4, a casting 115 encloses the pilot valve cylinder 116 having end bells 103 and 117. As shown in FIG. 3, a casting 104 enclosing a control cylinder 121 has end bell caps 105 and 106 mounted on the casting by respective bolts 125 and 126, the end bell caps 103 and 117 (FIG. 4) being attached to the pilot cylinder casting 115 by respective bolts 128 and 129. Within the cylinder 116, the pilot valve has an arbor 10 on which is mounted valves 131, 132, 133, and 134, with end pistons 136 and 137. The control valve (FIG. 3) has an arbor 14 on which is mounted a pair of valves 140, another pair of valves 141, single valves 142 and 143, and two additional pairs of valves 144 and 145, the operation of which will be explained hereinafter. Although the arbor 14 is shown in one section for purposes of illustration, the arbor is of three sections to facilitate alignment of the valves and replacement of worn parts.

Referring again to the power cylinder 100 in FIG. 3, this cylinder encloses a double-headed power piston made up of an arbor 6 and piston heads 146 and 147, the end cylinders 68 and 150 initiating the fertilizer flow.

To explain the operation of the unit, particular reference is made to FIGS. 3 and 4, it being understood that wherever the arrows are shown double-headed, there is a reverse flow of water or fertilizer through the ports, pipes or conduits, while the single-headed arrows indicate a single direction of liquid flow. Thus, with the valve 92 shown in FIG. 1 open, water will flow from the pipe 79 up the manifold conduit 151 through conduit 152 into the control cylinder 121 between valves 142 and 143, through port 153 and port 154 to the cylinder 100 behind the piston head 147 as shown by the arrow 7. This flow of water will move the power piston 6 to the left as shown in FIG. 3. The water also flows from control cylinder 121 through center port 5 into the pilot valve cylinder 116.

After piston 6 reaches the position shown in FIG. 3, water will flow through port 8 and conduit 156 to the right hand end of pilot valve 10 as shown by the arrow 11 in FIG. 4. When the pilot valve is moved by the piston 137 to the position shown in FIG. 4, port 12 is uncovered and in fluid communication with center port 5 to permit water to flow to the right hand end of control valve 14 through tube 24 (FIGS. 1 and 2) to valve or piston head 26 (FIG. 3). The water at the left hand end of control valve 14 is now discharged from cylinder head 122 at port 28 through conduit 29 (FIGS. 1 and 2) into pilot valve housing 30 through ports 31 and 32 (see FIG. 8) to outlet tube 33 and discharge manifold 22 to outlet 34 (FIGS. 6 and 8). During this operation of the cycle, water in the left hand end of power cylinder 100 (FIG. 3) is forced out through port 16, port 18, and port 20 to discharge manifold 22 (FIGS. 6 and 7).

During this water cycle, liquid fertilizer from tank 50 flows through pipe 51 (FIGS. 5–7) to manually controlled valve 52 where it is diverted to either tube 53 or tube 54 depending upon the portion of the water cycle. During the movement of power piston 6 to the left in FIG. 3, the fertilizer is drawn into chamber 56 from tube 54 through ports 58, 60, 61, pipe 62, and port 63 of cap 64 (FIGS. 3 and 9). During this portion of the water cycle, fertilizer previously drawn into chamber 66 is forced out of the chamber by piston 68 (FIG. 3) through port 70 in cap 71, tube 53 (FIG. 1), ports 73 and 74 to manifold 76 and into venturi tube 78 where it mixes with the irrigation water in conduit 79 flowing in the direction shown by arrows 80 (FIG. 1).

This completes one-half cycle of operation of the pump. The other half cycle of the operation is in the reverse order since control valve 14 now lets in water to the left hand end of piston 146 through ports 152, 18, and 16 to move piston 146 to the right. This is accomplished by the fact that the valve 142 is now on the left hand side of port 18. At the end of this power stroke, water will flow out of port 82 to the left hand end of pilot valve 10 through port 83. Movement of pilot valve 10 to the right opens port 84 (FIGS. 3 and 8) to let water flow to the left hand end of control valve 14 to move this valve to right. This lets the water behind the right hand end of the control valve flow through tube 24 (FIGS. 1 and 2) to port 82 and pilot valve housing 30 to tube 33 and discharge manifold 22. Port 86 (FIGS. 3 and 4) has a corresponding port on the opposite side of the power cylinder which permits interconneection between the two tubes of the pilot valve housing to permit water to discharge through a single outlet 33 to the discharge manifold 22 (see FIG. 8). During this half cycle, the fertilizer from tank 50 will be drawn into chamber 66 through port 70, tube 72, ports 73 and 87, tube 53, valve 52 and supply line 51. The fertilizer in chamber 56 is now forced out of port 63 through tube 62, ports 61, 60, and 88 (FIG. 3) into venturi tube 78 and water pipe 79.

In the position shown in FIGURE 4 for the pilot valve 10, the port 220 is channeled to outlet tube 33 and discharge manifold 22 (FIG. 8) to discharge port 34. Port 221 is similarly channeled to discharge port 34. Port 220 is shown in FIG. 4 closed off by seal 132, but port 221 is open to discharge for water coming from port 84. This action is reversed when piston 6 moves to the right in FIG. 3 uncovering port 82 which in turn drives piston 136 (FIG. 4) to the right. This closes off port 221 by seal 133 and connects center port 5 to port 84 (FIG. 4). Port 84 communicates with pipe 29 and piston 214 which is actuated to the right as shown in FIG. 3. Discharge water which had previously actuated piston 26 flows back through pipe 24, through ports 12 and 220 (FIG. 4), to outlet tube 33 and discharge manifold 22 (FIG. 8) and out through port 34.

The discharge manifold 22 has a discharge port 90 into valve 52 as shown in FIG. 7 permitting the pump in its operation to draw upon the discharge water instead of fertilizer so that the fertilizer tubes and ports, chamber, etc., can be automatically flushed to wash out and remove any contamination from this portion of the pump. By pretreating the water which is used to power the pump to soften the water, this water provides better flushing efficiency for the fertilizer section.

As mentioned above, valve 92 controls the amount of water from the main line 79 into the pump and by varying the water to the pump, the ratio of fertilizer to water is controlled. The floating valve between the fertilizer cylinders 101–102 and the piston cylinder 100 is disclosed and claimed in my copending application, Ser. No. 155,925, filed Nov. 30, 1961, and now abandoned. Also, the valve shown at 140–144 are disclosed and claimed in my copending application, Ser. No. 267,227, filed Mar. 22, 1963, and now abandoned.

The present pump is adapted to be connected and interconnected to the manifold 76 by inserting the extensions 200, 201 and 202 into manifold openings and tightening the clevises 111 and 112 with the finger nuts 205 and 206, FIG. 10 showing how the clevis 112 may be swung on its axle bolt pivot 208. The extensions 200, 201, and 202 are supplied with O-rings 210, 211, and 212 (FIG. 3), respectively, to seal their respective connections.

As mentioned above, it will be noted that the piston heads 26 and 214 of control valve 14 are larger in diameter than the arbor of the control valve 14, while the piston heads 136 and 137 of pilot valve 10 are larger than the arbor of the valve 10. In this manner, greater efficiency and reliability of operation of the pump is obtained. Furthermore, where the previous pump had interior conduiting, the present pump is provided with outside conduits such as shown at 53, 54, and 29 (FIG. 2), which facilitates assembling and cleaning and reduces the cost of the castings of the pump. Furthermore, by the use of the metering valve 92 (FIG. 1), the ratio of fertilizer to irrigation water is controllable by simply controlling the speed of operation of the pump.

Another important feature of the present invention is the manifold 22 in which the discharge water is fed so that upon operation of the valve 52 to the position shown in FIG. 7, which cuts off the fertilizer from the supply 51, the discharge water is fed through the portions of the pump used for passage of the fertilizer. In this manner, the pump may be thoroughly cleaned of fertilizer between the uses thereof for fertilizing. This is an important feature due to the fact that many fertilizers have an acid-alkaline variance from a pH of 2 to 10 which affects the pump materials. Furthermore, a screen may be provided in the water supply to prevent sand from entering the pump.

I claim:

1. A pump activated by irrigation water in a supply pipe for injecting liquid fertilizer into said water comprising a power cylinder with a piston therein, a pilot cylinder with a pilot valve piston therein, a control cylinder with a control valve piston therein, conduit means for enabling water to flow through said control cylinder to and from said power cylinder for actuating said power cylinder piston, conduit means for enabling water from said power cylinder to actuate said pilot valve piston and for enabling water from said pilot piston to actuate said control valve piston, a reservoir for receiving water discharged from said control cylinder and from said pilot cylinder, a fertilizer cylinder with a piston therein attached to each end of said power cylinder piston, means for introducing fertilizer into said fertilizer cylinders, conduit means for enabling fertilizer to flow through said control cylinder from said fertilizer cylinders for discharge into said water, and a valve connected between said reservoir and said fertilizer cylinders for selectively controlling the flow of water in said reservoir to said fertilizer cylinders.

2. A pump in accordance with claim 1 in which said control valve and pilot valve pistons have larger end portions than their central portions.

3. A pump in accordance with claim 1 in which said cylinders are within respective castings, external conduits being provided for conducting water between said cylinders.

4. A pump in accordance with claim 1 in which each of said pilot and control cylinder pistons include an arbor having one diameter, sliding valves mounted on said arbors and having a larger diameter and actuating portions at the ends of said arbors having diameters larger than the diameters of said valves.

5. A pump in accordance with claim 1 in which a manifold is provided for attaching and detaching said pump to and from said supply pipe.

6. A pump in accordance with claim 1 and further including a valve connected between said supply pipe and said control cylinder for selectively varying the rate of flow of water to said control cylinder and the amount of fertilizer injected into said water.

7. A pump actuated by irrigation water and controlling the amount of liquid fertilizer injected into said water comprising five moving sections, one section being a power section having a reciprocal piston actuated by said water, a pilot section having a reciprocal piston actuated by water from said power section, a control section having a reciprocal piston actuated by water from said pilot section, said control section controlling the flow of water to said power section, a fertilizer control section connected to each end of said power section piston for introducing fertilizer into said fertilizer control section and for injecting said fertilizer into said water, a reservoir for receiving water discharged from said pilot and said control sections and valve means connected between said reservoir and each fertilizer control section for selectively introducing either water from said reservoir or fertilizer to each fertilizer control section.

References Cited

UNITED STATES PATENTS

| 1,954,442 | 4/1934 | Dall et al. | 137—99 X |
| 2,445,540 | 7/1948 | Smillie | 137—98 |
| 2,841,165 | 7/1958 | Emery | 137—99 |
| 2,920,640 | 1/1960 | Porter | 137—99 |

WILLIAM F. O'DEA, *Primary Examiner.*

D. J. ZOBKIW, *Assistant Examiner.*